(12) United States Patent
Yurgevich (10) Patent No.: US 6,485,054 B1
(45) Date of Patent: Nov. 26, 2002

(54) ADJUSTABLE WHEELBASE TRAILER INCLUDING REINFORCED STRUCTURAL APERTURES

(75) Inventor: Howard J. Yurgevich, Chula Vista, CA (US)

(73) Assignee: Hyundai Precision America, Inc., San Diego, CA (US)

( * ) Notice: Subject to any disclaimer, the term of this patent is extended or adjusted under 35 U.S.C. 154(b) by 0 days.

(21) Appl. No.: 09/689,502

(22) Filed: Oct. 12, 2000

(51) Int. Cl.[7] .................................................. B62D 63/06
(52) U.S. Cl. ...................... 280/789; 280/799; 280/149.2
(58) Field of Search ........................... 280/149.2, 407.1, 280/407, 405.1, 789, 799, 781; 72/335

(56) References Cited

U.S. PATENT DOCUMENTS

| | | | |
|---|---|---|---|
| 2,835,504 A | * | 5/1958 | Acker ...................... 280/149.2 |
| 3,080,191 A | * | 3/1963 | Schmidt et al. ........... 280/149.2 |
| 3,618,969 A | | 11/1971 | Glassmeyer |
| 3,778,079 A | * | 12/1973 | Vornberger et al. ....... 280/149.2 |
| 3,878,950 A | * | 4/1975 | Quinn et al. .................... 72/335 |
| 3,963,259 A | | 6/1976 | Massey |
| 4,119,328 A | | 10/1978 | Rhodes |
| 5,230,237 A | * | 7/1993 | Johansson ...................... 72/335 |
| 5,758,890 A | * | 6/1998 | Wessels .................... 280/149.2 |

* cited by examiner

*Primary Examiner*—Peter C. English
(74) *Attorney, Agent, or Firm*—Luce, Forward, Hamilton & Scripps LLP (57) ABSTRACT

A tractor trailer having an adjustable wheel assembly, the trailer comprising at least two laterally spaced frame members. A plurality of openings are located in the frame members, with each opening having a flange section structured to receive a wheel assembly locking-pin. The flange section increases the load-bearing area of each frame member opening.

16 Claims, 7 Drawing Sheets

ADJUSTABLE WHEELBASE TRAILER INCLUDING REINFORCED STRUCTURAL APERTURES

FIELD OF THE INVENTION

The field of the present invention relates to trailers used for overland transport of goods. More particularly, the present invention relates to adjustable wheelbase trailers.

BACKGROUND OF THE INVENTION

Commercial tractors and other types of trucks transport freight or goods using trailers such as flatbeds, platform trailers, enclosed vans, container transport chassis or other suitable types of trailers. Many of these transport vehicles have adjustable wheel assemblies that allow the operator to change the trailer or vehicle wheelbase. The wheelbase must be adjusted for a variety of reasons including decreasing the turning radius and improving weight distribution to meet Federal axle-weight requirements.

Figure 1:
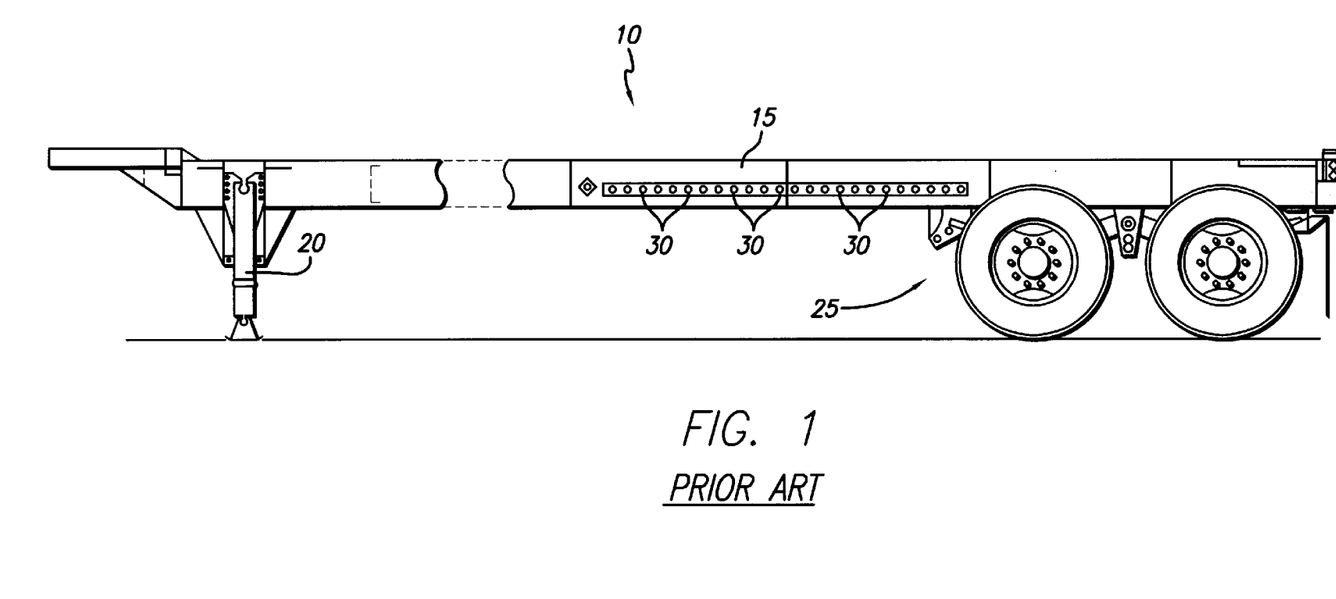
FIG. 1 is a side elevation view of a conventional tractor trailer employing an adjustable wheel assembly.
Figure 2:
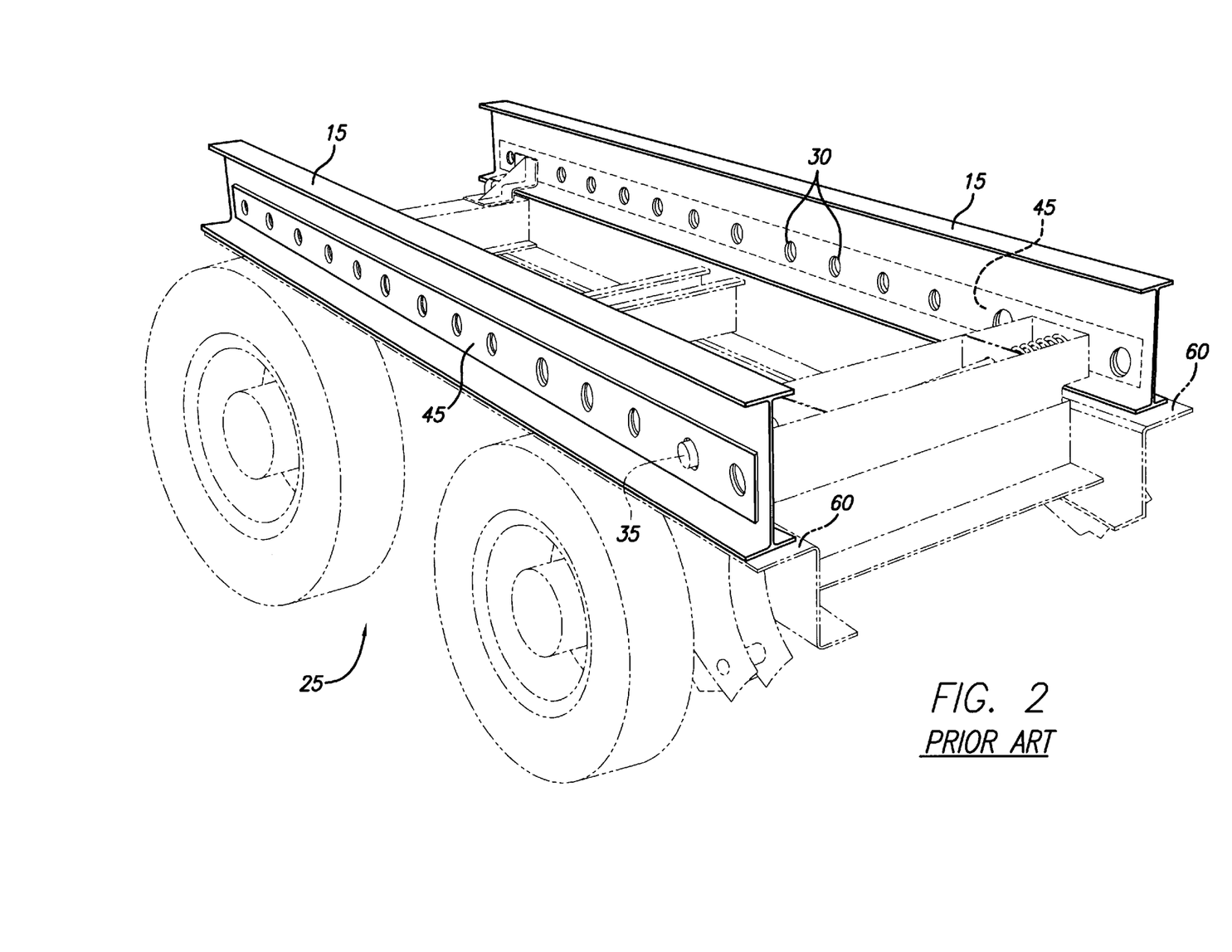
FIG. 2 is a perspective view of the conventional wheel assembly illustrated in FIG. 1.

As illustrated in FIGS. 1 and 2, a tractor trailer used 10 includes a front support strut assembly 20 and an adjustable wheel assembly or "bogie" 25 joined by at least two frame rails 15. The front support 20 and rails 15 form a main trailer or chassis structure to which the bogie 25, is slidably attached. The bogie 25 comprises at least one, and usually two axles with four wheels rotatably mounted to each axle. When the operator wants to change the trailer 10 wheelbase, the operator changes the location of the bogie 25 relative to the main trailer structure.

The bogie 25 has bogie lock pins 35 receivable into bogie lock pin holes 30, which extend through the rails 15. Accordingly, when the bogie lock pins 35 are inserted and locked into the boogie lock pin holes 30, the bogie 25 is securely positioned and held.

The bogie 25 location is usually moved by locking the wheels, retracting the bogie lock pins 35 from the bogie lock pin holes 30 and using the tractor to slide the trailer frame rails 15 on the bogie rails 60. Once the bogie 25 has been positioned in the desired location, the bogie lock pins 35 are re-inserted into the bogie lock pin holes 30. Typically, at least two bogie lock pins 35 are used, one for each rail 15.

Figure 3:
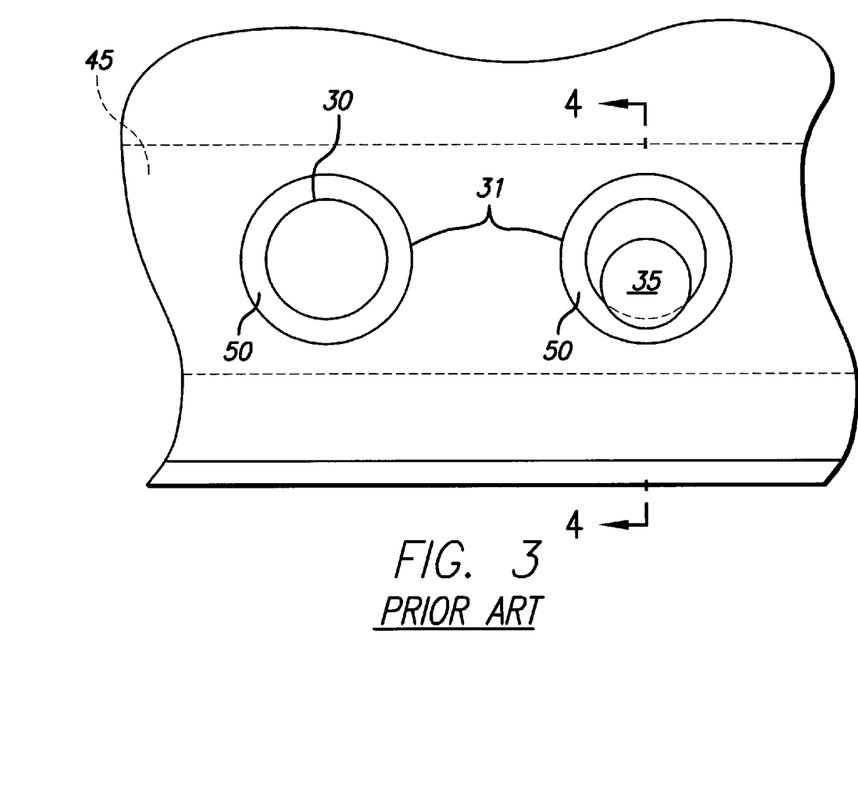
FIG. 3 is a side elevation view of the conventional trailer frame rail of FIG. 2, illustrating a reinforcement plate and a misaligned lock pin.
Figure 4:
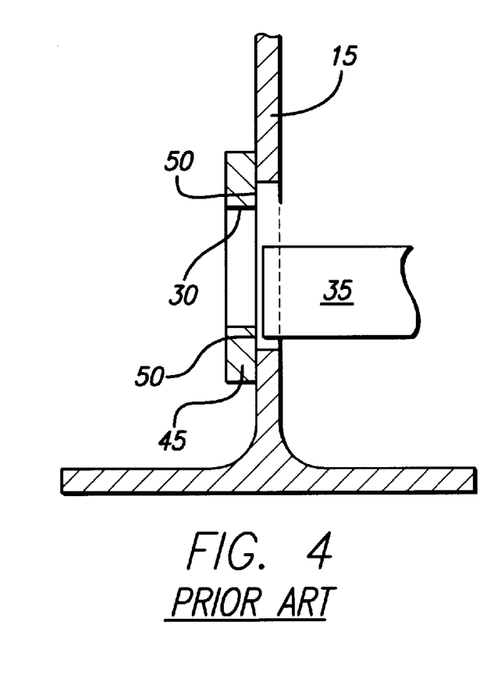
FIG. 4 is a cross-section taken along cutting plane 4—4 of FIG. 3.

Referring to FIGS. 2–4, a bolster strip 45 is welded around the bogie lock pin holes 30 to reinforce the frame rail 15 and bogie lock pin holes 30 against the loads imparted through the bogie lock pins 35 and into the frame rail 15 by the bogie 25. When inserted into the bogie lock pin holes 30, the bogie lock pins 35 only engage a thin ring of frame rail 15 material that comprises the perimeter of the bogie lock pin hole 30. Substantially all of the loads encountered by the bogie 25 are transferred to the trailer 10 through this thin ring of frame rail 15 material.

The bolster strip 45 is generally welded to the outside of the frame rail 15 with the frame rail aperture 31 having a larger diameter than the bogie lock pin hole 30. This creates a bolster lip 50, illustrated in FIGS. 3–4. As a result, when the bogie 25 is repositioned to change the trailer wheelbase, the bogie lock pin 35 oftentimes contacts the bolster lip 50 and fails to properly engage the bogie lock pin hole 30. When the bogie lock pin 35 fails to properly engage the bogie lock pin hole 30, an extremely unsafe situation is created because the bogie 25 is no longer positively attached to the frame rails 15.

In addition, moisture accumulates between the bolster strip 45 and the frame rail 15, causing corrosion around the bogie lock pin holes 30 and decreasing the structural strength and integrity of the frame rails 15 and the bolster strip 45. Also, because substantially all the bogie 25 loads are carried by the thin ring of bolster strip 45 material, the bogie lock pin hole 30 perimeters become oval, which introduces play or slack in the bogie 25, increasing the possibility of disengagement of the bogie 25 from the trailer 10. Also, corroded frame rails 15 can fail when the trailer 10 is loaded with cargo, and this failure can occur while the trailer 10 is operating in highway traffic, possibly resulting in a serious accident.

Therefore, there exists a need for an adjustable wheelbase trailer that can withstand the loads imparted by a bogie, without deformation of the bogie lock pin holes, and can also consistently ensure positive engagement of the bogie to the trailer.

SUMMARY OF THE INVENTION

In order to overcome the deficiencies with known, conventional bogie location systems, an adjustable wheelbase trailer is provided. Briefly, the present invention solves the problem of a bogie lock pin failing to properly engage a bogie lock pin hole. In addition, the present invention solves the problem of bolster strip corrosion and the subsequent structural deformation of the bolster strip, bogie lock pin holes and the underlying frame rail.

An adjustable wheelbase trailer constructed according to the present invention provides a way to consistently engage the bogie lock pins into the bogie lock pin holes. Moreover, the present invention removes the bolster strip thereby eliminating corrosion of the trailer frame rails and bogie lock pin hole perimeters, and in such manner trailer life is increased and manufacturing costs are reduced.

Broadly, the present invention provides a method to remove the bolster strip while maintaining sufficient bogie lock pin hole strength to prevent deformation. In addition, the invention improves engagement of the bogie lock pins in the bogie lock pin holes.

More specifically, one embodiment of the invention forms a flanged bogie lock pin hole in a trailer frame member by punching an hole in the trailer frame member, deforming a perimeter area of the hole, and extruding the deformed perimeter area so that the perimeter of the extruded hole is larger than the punched hole. The extruded material thus forms a flange which the bogie lock pin engages.

Another embodiment of the invention comprises a trailer having an adjustable wheel assembly, the trailer comprising at least two laterally spaced frame members. A plurality of openings are located in the frame members, with each opening having a flange section structured to receive an adjustable wheel assembly bogie lock pin.

BRIEF DESCRIPTION OF THE DRAWINGS

The nature, goals, and advantages of the invention will become more apparent to those skilled in the art after considering the following detailed description when read in connection with the accompanying drawing in which like reference numerals identify like elements throughout and wherein.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention.

Figure 5:
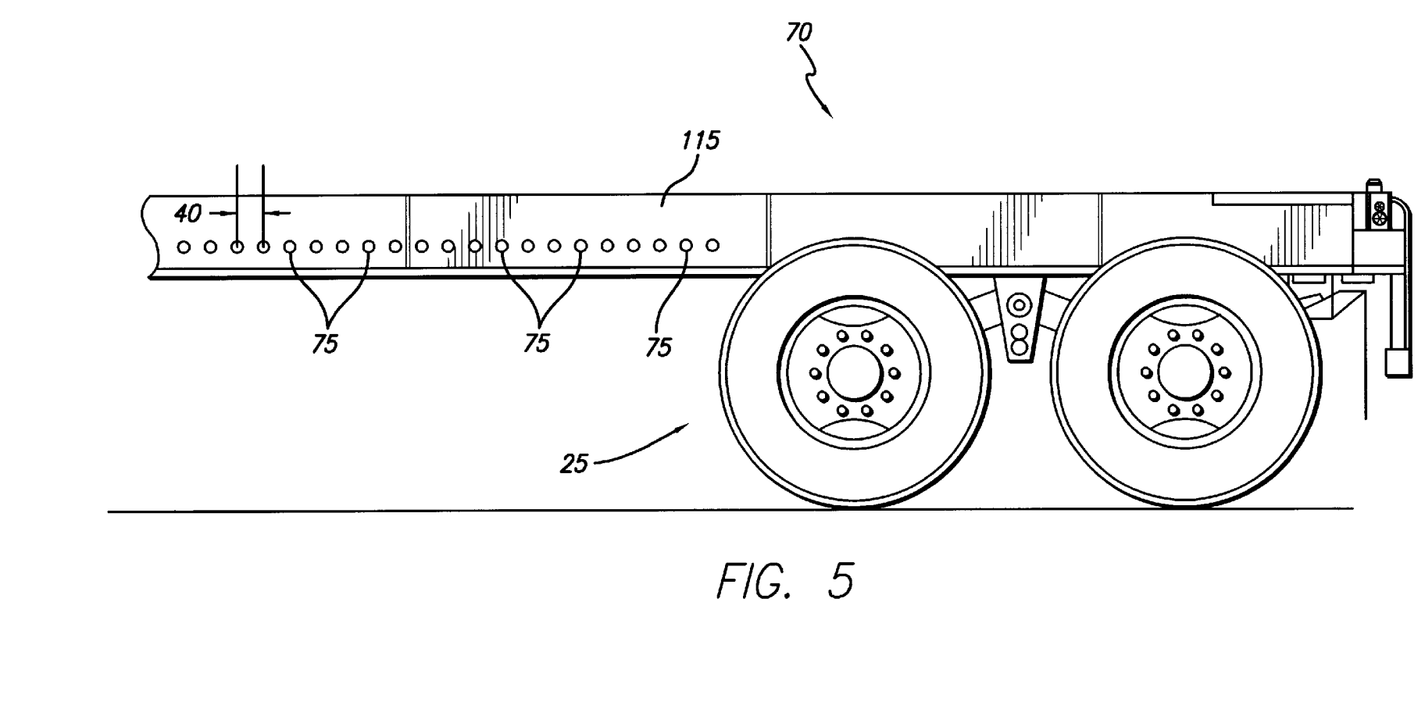
FIG. 5 is a side elevation view of a tractor trailer constructed according to one embodiment of the present invention.

An adjustable wheelbase trailer 70 in accordance with one embodiment of the invention is illustrated in FIG. 5. The adjustable trailer 70 includes frame rails 115, a slideable wheel assembly or bogie 25 and flanged bogie lock pin holes 75 located in the frame rails 115. The distance 40 between bogie lock pin hole centers can range from about 4 to 6 inches depending upon the trailer requirements, and the number of bogie lock pin holes or openings 75 can vary from about 6 to about 27.

As used herein, a trailer is defined to include adjustable wheelbase trailers, platform trailers, container transport chassis, bare chassis, enclosed van trailers and other types of trailers.

The bogie 25 can be adjustably positioned on the frame rails 115 by locking the wheels, retracting the bogie lock pins 35, and moving the frame rails 115 to change the position of the bogie 25 relative to the frame rails 115. When the desired wheelbase is reached, the bogie lock pins 35 are inserted into the flanged bogie lock pin holes 75.

Figure 6:
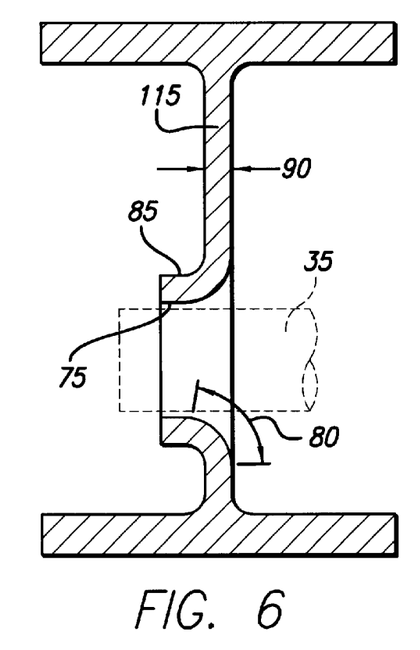
FIG. 6 is a cross-sectional view of a tractor trailer frame rail of FIG. 5, illustrating a locating hole constructed according to one embodiment of the present invention.
Figure 7:
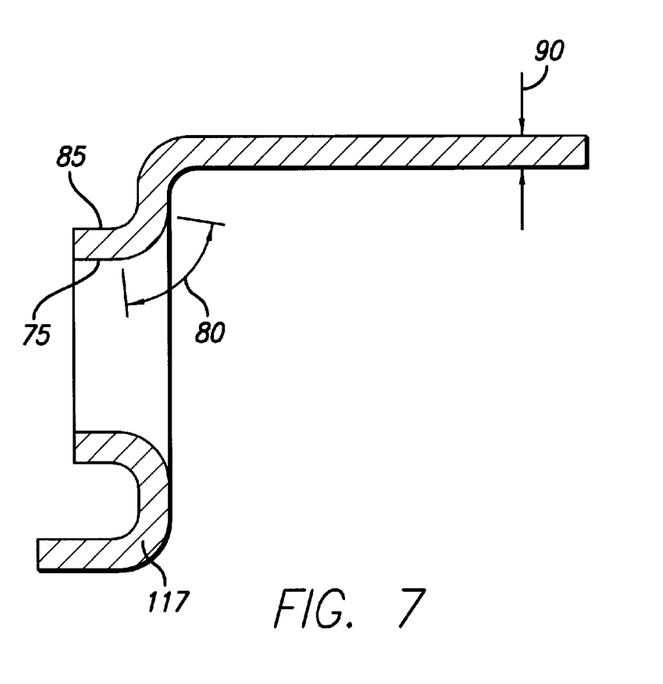
FIG. 7 is a cross-sectional view of an alternative embodiment tractor trailer frame rail, illustrating a locating hole constructed according to a second embodiment of the present invention.

The bogie lock pin holes 75 include a flange or lip or radiused projection 85, illustrated in FIGS. 6 and 7. In one embodiment, the flange height or depth is about 1.5 times greater than the thickness 90 of the S-shaped frame rail 117 (FIG. 7). The 1.5 ratio is also employed on the I-beam frame rail 115 (FIG. 6). However, it will be appreciated that this ratio could vary from about 1 to 1 (flange height equivalent to frame thickness 90) to about 3 to 1 (flange height about three times greater than frame thickness 90), depending upon the thickness of the frame rail 115 and the desired flange size. Accordingly, the adjustable wheelbase trailer 70 of one embodiment of the present invention does not need the undesirable welded bolster strip of the conventional bogie.

FIG. 6 depicts a bogie lock pin hole in a web of an I-beam frame rail 115 and FIG. 7 illustrates a bogie lock pin hole in an S-shaped frame rail 117. It will be appreciated that the flanged bogie lock pin holes 75 of the present invention can also be employed in other suitable types of frame rails, depending on the trailer 70 requirements. In addition, the thickness 90 of the I-beam frame rails 115 can vary from about 0.15 inches to about 0.3 inches, depending upon the desired load carrying capacity of the trailer 70.

The flanged bogie lock pin hole 75 of the present invention supports the bogie lock pin 35 and increases the structural strength of the bogie lock pin hole 75 by increasing the load bearing area of the bogie lock pin hole 75. In contrast to a conventional bogie lock pin hole which typically only has a thin ring of material, the flanged bogie lock pin hole 75 constructed according to the present invention comprises a flange height that distributes the bogie lock pin 35 load over the entire flange, thereby greatly increasing the load distribution area, and thus decreasing the stress encountered by the flanged bogie lock pin hole 75. This substantially eliminates the generation of oval holes and therefore eliminates bogie lock pin 35 play. Moreover, because the bolster strip 45 is eliminated, corrosion is eliminated as moisture pockets cannot form between the bolster strip 45 and the frame rail 15.

Referring to FIGS. 6–7, in contrast to conventional bogie lock pin holes 30, one embodiment of the flanged bogie lock pin hole 75 constructed according to the present invention has a hole perimeter radius 80 that facilitates insertion of the bogie lock pin 35 into the bogie lock pin hole 75. Because the bolster bar 45, and thus the bolster lip 50 is eliminated from the present invention, the bogie lock pins 35 do not catch on the bolster lip 50. A preferred embodiment flanged bogie lock pin hole 75 has a diameter of about 1 7/8 of an inch. However, it will be appreciated that the bogie lock pin hole diameter can vary depending upon the diameter of the bogie lock pin 35. For example, the diameter of the bogie lock pin hole 75 may range between about 1.5 to about 2.5 inches.

Figure 8:
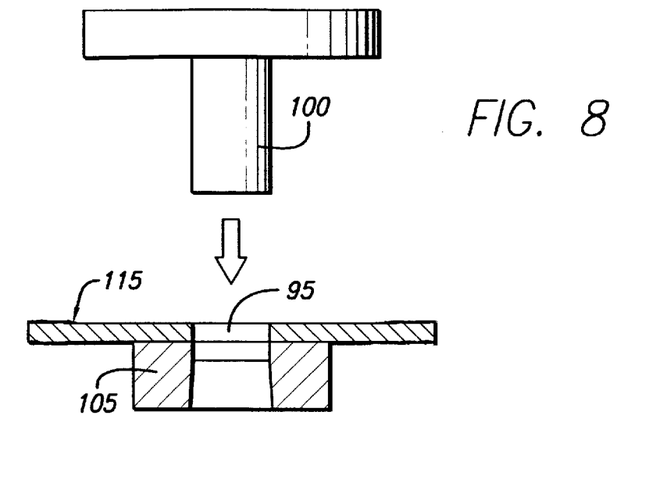
FIG. 8 is a cross-sectional view of a method of making a start hole according to the present invention.
Figure 9:
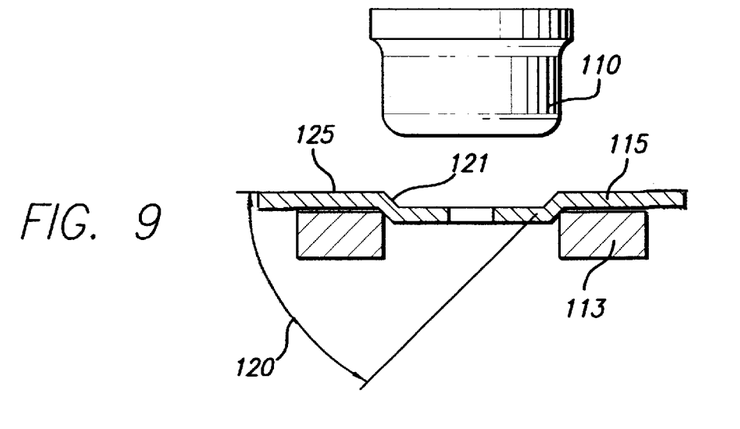
FIG. 9 is a cross-sectional view of a method of deforming a perimeter area of the start hole illustrated in FIG. 8.
Figure 10:
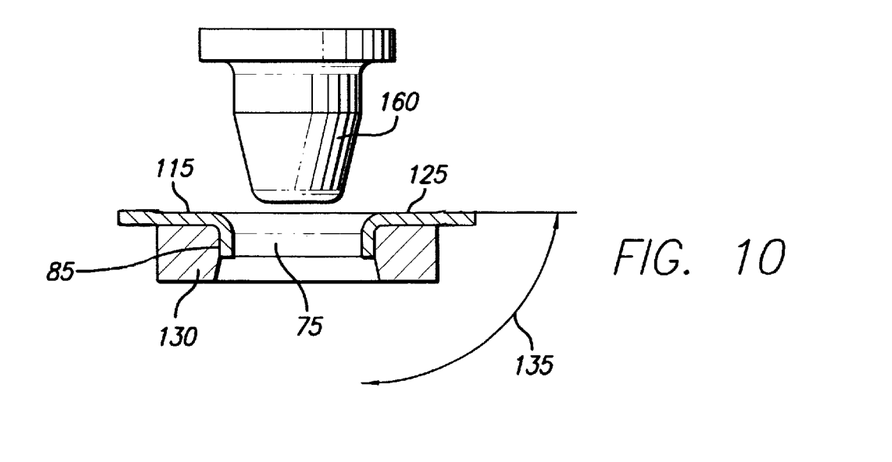
FIG. 10 is a cross-sectional view of a method of forming a flanged aperture from the deformed perimeter area illustrated in FIG. 9.

Referring to FIGS. 8–10 a flanged bogie lock pin hole 75 according to the present invention is manufactured by punching a start hole 95 in frame rail 115. In one embodiment of the flanged bogie lock pin hole 75, the start hole 95 is about 1.5 inches in diameter. It will be appreciated that the start hole can vary in diameter depending upon the requirements for the flanged bogie lock pin hole diameter. In a preferred embodiment the start hole 95 is formed by a start hole punch 100 that punches the start hole 95 from the frame rail 115 when the start hole punch 100 is positioned over a start hole punch support plate 105.

Illustrated in FIG. 9, after the start hole 95 is formed, an intermediate punch 110 is used to form an intermediate flange 121 around the start hole 95. The diameter of the intermediate flange 121 is determined by the desired flange height. As discussed above, the flange height can vary from about 1 to about 3 times the frame thickness 90. Frame rail 115 is placed over the support plate 113 and the intermediate punch 110 contacts the frame 115, forming the intermediate flange 121. An intermediate flange angle 120 of about 45 degrees is formed relative to the frame rail surface 125. It will be appreciated that the intermediate flange angle 120 can vary, depending upon the punch, and the desired intermediate flange deformation.

In FIG. 10 the final punching process is completed with the final flange punch 160. The final flange punch 160 can either use the intermediate punch support plate 113 or a final flange punch support plate 130. A final flange angle 135 of about 90 degrees is formed in the frame rail 115 after the final punch 160 deforms the frame rail 115. In this embodiment, the height of the flange 85 is now about 1.5 times the frame rail thickness 90.

Figure 11:
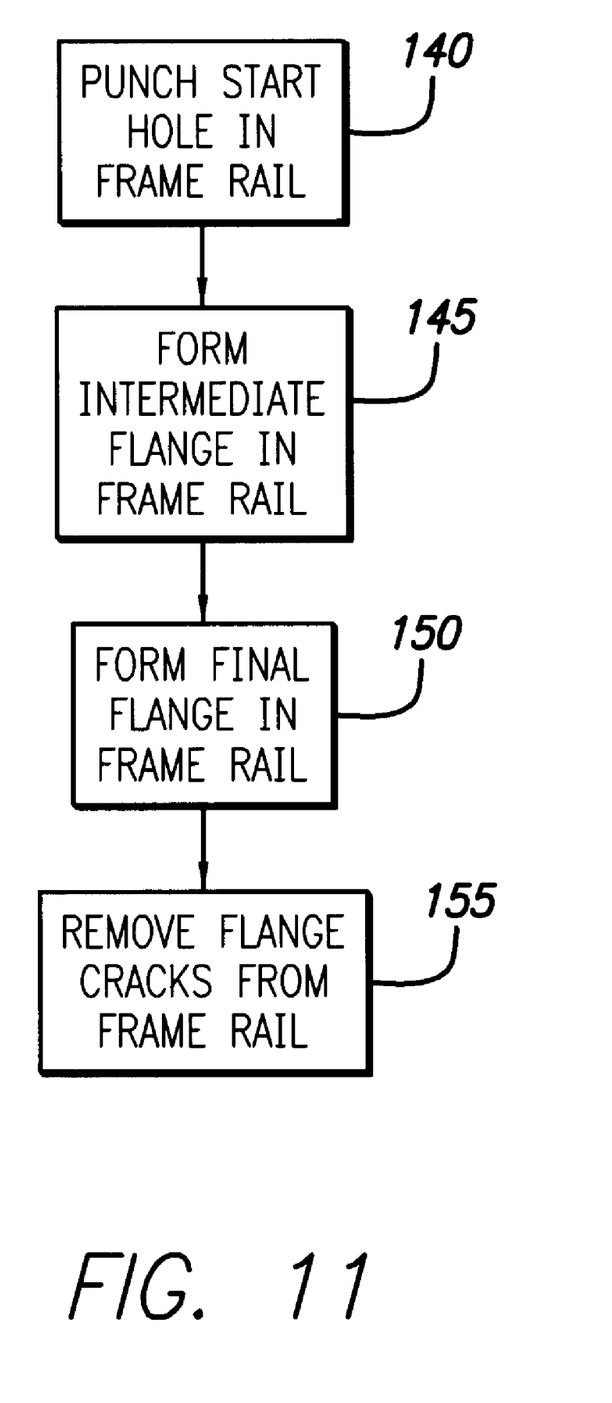
FIG. 11 is a flow chart illustrating a method of making a flanged trailer frame rail locating hole according to the present invention.

FIG. 11 illustrates a preferred method of forming a flanged bogie lock pin hole 75 according to the present invention. In step 140 a start hole 95 is punched in the frame rail 115. It will be appreciated that the frame rail 115 can be an I-beam, an S-beam 117 or any other suitable trailer beam or frame rail. In step 145 an intermediate punch 110 is used to form an intermediate flange 121. In step 150 a final punch 160 is used to form a final flange 85. In step 155 flange cracks (not shown) which can form at the outer periphery of the flange are removed by a grinding or other suitable abrading process. In an alternative method of forming a flanged bogie lock pin hole 75 according to the present invention, a progressive die or punch is employed wherein the frame rail 115 passes over the progressive die stations and the start hole 95 is punched, the intermediate flange 121 is formed, the final flange 85 is formed and any flange cracks are removed in a series of steps. It will be appreciated that other types of hole forming operations could also be employed to form the flanged hole 75.

One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A trailer including a slideable wheel assembly, the trailer comprising:

a plurality of openings located in a frame member;

wherein each opening is structured to receive a wheel assembly lock pin, wherein a perimeter of each opening comprises a radiused projection forming an enlarged entry that facilitates insertion of a lock pin.

2. The trailer of claim 1, wherein each projection has a depth that exceeds a thickness of the frame member.

3. The trailer of claim 2, wherein the thickness of the frame member ranges between about 0.15 to about 0.3 inches.

4. The trailer of claim 1, wherein a perimeter of each opening includes a radius.

5. The trailer of claim 1, wherein the frame member is selected from the group consisting of I-beams, and S-beams.

6. The trailer of claim 1, wherein the frame member is comprised of an I-beam including a web section and the plurality of openings are located in the web section.

7. The trailer of claim 1, wherein the projections are substantially perpendicular to the openings.

8. The trailer of claim 1, wherein each projection includes a depth that ranges between about 1 to about 3 times greater than a thickness of the frame member.

9. The trailer of claim 1, wherein the openings have a diameter that ranges between about 1.5 to about 2.5 inches.

10. The trailer of claim 1, wherein the number of openings located in the frame member ranges between about 6 to about 27.

11. The trailer of claim 1, wherein each opening has a center, and the centers are spaced about 4 to 6 inches apart from each other.

12. A trailer having a moveable wheel assembly, the trailer comprising:

a plurality of openings located in at least two frame members;

wherein a perimeter of each opening comprises a radiused projection forming an enlarged entry that facilitates insertion of a wheel assembly lock pin, wherein each radiused projection has a height that exceeds a frame member thickness.

13. The trailer of claim 12, wherein each frame member is selected from the group consisting of I-beams, and S-beams.

14. The trailer of claim 12, wherein each of the frame members is comprised of an I-beam including a web section and the plurality of openings are located in the web sections.

15. The trailer of claim 12, wherein each radiused projection is substantially perpendicular to each opening.

16. The trailer of claim 12, wherein each radiused projection includes a depth that ranges between about 1 to about 3 times greater than a thickness of each frame member.

\* \* \* \* \*